(12) United States Patent
Côté et al.

(10) Patent No.: US 8,677,682 B2
(45) Date of Patent: Mar. 25, 2014

(54) THIN WALL SAP COLLECTING DEVICE

(75) Inventors: Martin Côté, Stratford (CA); Léandre Vachon, Thetford Mines (CA)

(73) Assignee: Le Groupe DSD Inc., Thetford Mines, Quebec (CA)

( * ) Notice: Subject to any disclaimer, the term of this patent is extended or adjusted under 35 U.S.C. 154(b) by 3 days.

(21) Appl. No.: 13/345,373

(22) Filed: Jan. 6, 2012

(65) Prior Publication Data

US 2013/0174478 A1 Jul. 11, 2013

(51) Int. Cl.
*A01G 23/10* (2006.01)
*A01G 23/14* (2006.01)

(52) U.S. Cl.
USPC ........................................ 47/52; 47/11; 47/51

(58) Field of Classification Search
USPC .................................................. 47/11, 50–54
See application file for complete search history.

(56) References Cited

U.S. PATENT DOCUMENTS

| | | | | |
|---|---|---|---|---|
| 29,884 | A | * | 9/1860 | Hecox .............................. 47/52 |
| 39,072 | A | | 6/1863 | Sheldon |
| 45,163 | A | * | 11/1864 | McCombs ....................... 47/52 |
| 45,996 | A | | 1/1865 | Hays |
| 48,961 | A | | 6/1865 | Leitch |
| 76,402 | A | | 4/1868 | Conner |
| 117,326 | A | | 7/1871 | Post |
| 144,871 | A | * | 11/1873 | Sevey .............................. 47/52 |
| 184,304 | A | | 11/1876 | Shipherd |
| 195,295 | A | | 9/1877 | Lord |
| 225,762 | A | | 3/1880 | Pierce |
| 234,437 | A | * | 11/1880 | Spelman ........................... 47/52 |
| 265,146 | A | * | 9/1882 | Record ............................. 47/52 |
| 279,284 | A | * | 6/1883 | Stark ................................ 47/52 |
| 283,593 | A | | 9/1883 | Fox |
| 286,443 | A | | 10/1883 | Hunger-Ford |
| 296,059 | A | | 4/1884 | Post |
| 469,232 | A | | 2/1892 | Currier |
| 473,270 | A | | 4/1892 | Tabor |
| 506,386 | A | | 10/1893 | Wood |
| 542,795 | A | | 7/1895 | Cary |
| 563,584 | A | | 7/1896 | Foster |
| 566,728 | A | | 8/1896 | Lewis |
| 695,841 | A | | 3/1902 | Rudd |
| 729,330 | A | | 5/1902 | Grimm |
| 729,355 | A | | 5/1903 | Kilpatrick |
| 764,324 | A | | 7/1904 | Warner |
| 778,031 | A | | 12/1904 | Grimm |

(Continued)

FOREIGN PATENT DOCUMENTS

| CA | 400045 | 10/1941 |
|---|---|---|
| CA | 489913 | 1/1953 |

(Continued)

*Primary Examiner* — David Parsley
(74) *Attorney, Agent, or Firm* — IPAXIO S.E.N.C.

(57) ABSTRACT

The device is provided for collecting sap from a tapped hole of a tree. It includes a collector having a substantially frusto-conical outer peripheral wall surface and an inner peripheral wall surface. The collector also has a portion that is removably insertable into the tapped hole with a frictional engagement. The material between the peripheral wall surfaces at the removably-insertable collector portion is elastically and temporarily deformable in response to a peripheral pressure exerted inwardly on the outer peripheral wall surface when the removably-insertable collector portion is inserted with a forced frictional fit into the tapped hole.

10 Claims, 3 Drawing Sheets

(56) References Cited

U.S. PATENT DOCUMENTS

| | | | |
|---|---|---|---|
| 858,380 | A | 7/1906 | Gilmer |
| 841,039 | A | 1/1907 | McVoy |
| 887,012 | A | 5/1908 | O'Connor |
| 907,778 | A | 12/1908 | Gilmer |
| 908,744 | A | 1/1909 | Chasse |
| 930,361 | A | 8/1909 | Drake |
| 1,061,135 | A | 5/1913 | Soule |
| 1,107,969 | A | 8/1914 | Krager |
| 1,154,679 | A | 9/1915 | Whitcomb |
| 1,186,741 | A | 6/1916 | Brower |
| 1,207,444 | A | 12/1916 | Soule |
| 1,221,509 | A | 4/1917 | Chesley |
| 1,379,358 | A | 5/1921 | Oliver |
| 1,366,054 | A | 10/1921 | Blood |
| 1,511,632 | A | 10/1924 | Penska |
| 1,535,087 | A | 4/1925 | Barnett |
| 1,682,760 | A | 9/1928 | Laffin |
| 2,260,495 | A | 10/1941 | Tutwiler |
| 2,825,182 | A | 3/1958 | Ayres |
| 2,877,601 | A | 3/1959 | Griggs |
| 2,944,369 | A | 7/1960 | Soule |
| 2,958,158 | A | 11/1960 | Hatton |
| 3,046,698 | A | 7/1962 | Breen |
| 3,057,115 | A | 10/1962 | Bilanin |
| 3,156,069 | A | 11/1964 | Lamb |
| 3,204,370 | A | 9/1965 | Lamb |
| 3,469,344 | A | 9/1969 | Garvey |
| 3,596,402 | A | 8/1971 | Palmer |
| 3,864,874 | A | 2/1975 | Norris et al. |
| 4,112,616 | A | 9/1978 | Savage |
| 4,112,618 | A | 9/1978 | Savage |
| 4,299,053 | A | 11/1981 | Foote |
| 4,366,648 | A | 1/1983 | Morin |
| 4,512,104 | A | 4/1985 | Lamb |
| 4,884,365 | A | 12/1989 | Lesquir |
| 4,887,387 | A | 12/1989 | Lesquir |
| 4,926,597 | A | 5/1990 | Landry |
| 5,005,314 | A | 4/1991 | Chabot |
| 5,054,820 | A | 10/1991 | Lesquir et al. |
| 5,224,289 | A | 7/1993 | Buzzell |
| 5,303,504 | A | 4/1994 | Buzzell |
| 5,443,207 | A | 8/1995 | Genga |
| 5,564,227 | A | 10/1996 | Chabot |
| 6,370,818 | B1 | 4/2002 | Chabot |
| 6,438,895 | B1 | 8/2002 | Fortier |
| 6,453,604 | B1 | 9/2002 | Barranx et al. |
| 6,454,312 | B1 | 9/2002 | Desorcy et al. |
| 7,114,289 | B2 | 10/2006 | Black et al. |
| 2002/0014037 | A1 | 2/2002 | Dumas |
| 2005/0000153 | A1 | 1/2005 | White et al. |
| 2010/0078082 | A1* | 4/2010 | Perkins .................. 137/511 |
| 2010/0170152 | A1* | 7/2010 | Perkins ........................ 47/52 |

FOREIGN PATENT DOCUMENTS

| | | |
|---|---|---|
| CA | 652576 | 11/1962 |
| CA | 673374 | 11/1963 |
| CA | 718168 | 9/1965 |
| CA | 845384 | 6/1970 |
| CA | 1096637 | 3/1981 |
| CA | 1177261 | 11/1984 |
| CA | 1272381 | 8/1990 |
| CA | 1272382 | 8/1990 |
| CA | 1290944 | 10/1991 |
| CA | 1321261 | 8/1993 |
| CA | 2078481 | 3/1994 |
| CA | 2224908 | 6/1999 |
| CA | 2256138 | 6/1999 |
| CA | 2233739 | 9/1999 |
| CA | 2260495 | 7/2000 |
| CA | 2275731 | 12/2000 |
| CA | 2290900 | 5/2001 |
| CA | 2296847 | 7/2001 |
| CA | 2305862 | 10/2001 |
| CA | 2439494 | 3/2004 |
| CA | 2418298 | 8/2004 |
| CA | 2479982 | 3/2005 |
| CA | 2471257 | 12/2005 |
| CA | 2681732 | 12/2009 |

* cited by examiner

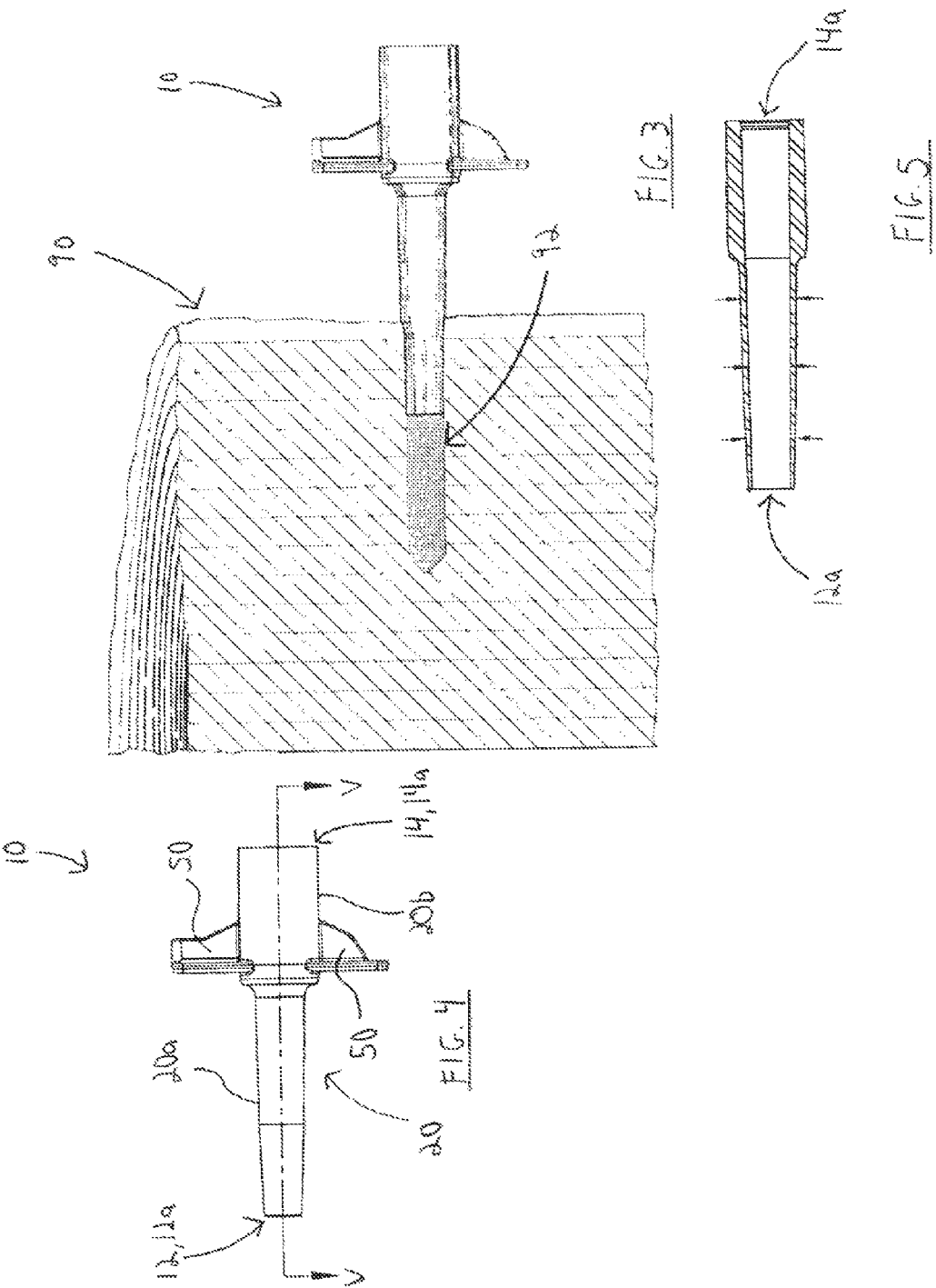

THIN WALL SAP COLLECTING DEVICE

TECHNICAL FIELD

The present invention relates to a sap-collecting device. More particularly, the present invention relates to a thin-walled sap-collecting device for collecting sap from a tree, and components related thereto.

BACKGROUND

Known in the art are various techniques and devices for collecting sap from a tree, for example from a maple tree. Over the years, the practice of collecting sap from trees has been refined and improved through the use of new devices and fixtures, and at least since the 1960s, by using vacuum recovery systems.

Canadian patent No. 2,233,739 discloses a vacuum recovery system including a tubular network connected to the sap-collecting devices affixed to the various trees so as to direct the sap that is collected towards reservoirs. The tubular network is connected to a pump creating vacuum conditions so as to provide a quick flow of sap from the tree to the reservoirs.

Sap collection devices, an example of which is schematically shown in FIG. 1, have changed relatively little over the years, and still present some disadvantages.

Conventional devices are hard and are inserted into the tree by a hammer pounding on one end, which is similar to a tapered punch. This can cause damage to the tree.

Furthermore, conventional devices often create small vertical cracks on either side of the tapped holes when they are inserted into the tree. These cracks accumulate water, and after various freeze/thaw cycles, especially during sustained cold weather conditions, the cracks tend to become larger, which results in the device becoming loose in the tapped hole and falling out. The cracks can also cause water to accumulate between the bark of the tree and the cambium so that when water freezes, the bark of the tree tend to lift, thereby causing further damage to the tree. After becoming loose, the device must be reinserted into the tapped hole by a hammer, which can cause further cracking, thereby perpetuating the cycle of cracking/reinsertion. After a certain number of these cycles, the tree is exposed to the elements and the liquid contained therein "dries up" or freezes. Furthermore, air is introduced between the collecting device and the tapped hole, which reduces the effectiveness of the closed vacuum system and thus the amount of sap that can be collected.

Cracks are known to reach a size of up to 10 square inches on both sides of a tapped hole, as shown schematically in FIG. 2. These cracks and the areas over which they propagate can cause significant damage to the tree being tapped, especially when multiple holes are made in the same tree. A further disadvantage caused by the cracking/reinsertion cycle is the need of additional labour to reinsert the sap-collecting devices repeatedly, often during cold weather conditions. Over time, there is a decrease in the tree's productivity (i.e. less sap collected for a given number of tapped holes).

Hence, there was clearly a need for an improved device to overcome or at least minimize some of the aforementioned problems.

SUMMARY

In accordance with the present invention, there is provided a device for collecting sap from a tapped hole of a tree and directing the sap to a collection system that is removably connectable to the device, the device including an elongated collector extending lengthwise between an inlet and an outlet of the device, the collector having a substantially frustoconical outer peripheral wall surface and an inner peripheral wall surface, both peripheral wall surfaces being spaced apart from one another by a thickness of a material, the thickness of the material decreasing between the outlet and the inlet of the device, the inner peripheral wall surface defining a sap channel for conveying the sap collected at the inlet to the outlet of the device, the collector having a portion that is removably insertable into the tapped hole with a frictional engagement, the material between the peripheral wall surfaces at the removably-insertable collector portion being elastically and temporality deformable in response to a peripheral pressure exerted inwardly on the outer peripheral wall surface when the removably-insertable collector portion is inserted with a forced frictional fit into the tapped hole, the thickness of the material being about $1/32$ inch or less at the inlet of the device.

Such a device can be particularly useful for collecting relatively large volumes of liquid (i.e. sap from a tree) without causing significant damage to the tree, and which can be easily used by amateur and professional sap collectors alike. This is due namely to the substantially frustoconical inner and outer peripheral wall surfaces of each collector section which enables the device to be "thin-walled" or have relatively small thicknesses when compared to conventional sap-collecting devices. The frustoconical inner and outer peripheral wall surfaces also allow the device to have collector sections which have different inside and/or outside angles and radius, thus permitting the thickness and the shape of the device to vary along its length. This advantageously allows the device to respond to a pressure exerted peripherally by the tree when the device is inserted into the tapped hole, thus providing for a relatively air and water-tight fit with the tree irrespective of the insertion depth of the device into the tapped hole.

The device can include a plurality of collector sections, with different angles and shapes, each collector section being connected adjacently to one another, these collector sections forming a uniform and seamless elongated collector.

Objects, advantages and other features of the present invention will become more apparent upon reading of the following non-restrictive description, given for the purpose of exemplification only, with reference to the accompanying drawings.

BRIEF DESCRIPTION OF THE DRAWINGS

FIG. 3 is a side elevational view of a sap collection device being inserted into a tapped hole of a tree, according to the present invention.

FIG. 4 is a side elevational view of the device shown in FIG. 3.

FIG. 5 is a cross-sectional view of the device of FIG. 4 taken along line V-V in FIG. 4.

DETAILED DESCRIPTION

Figure 1:
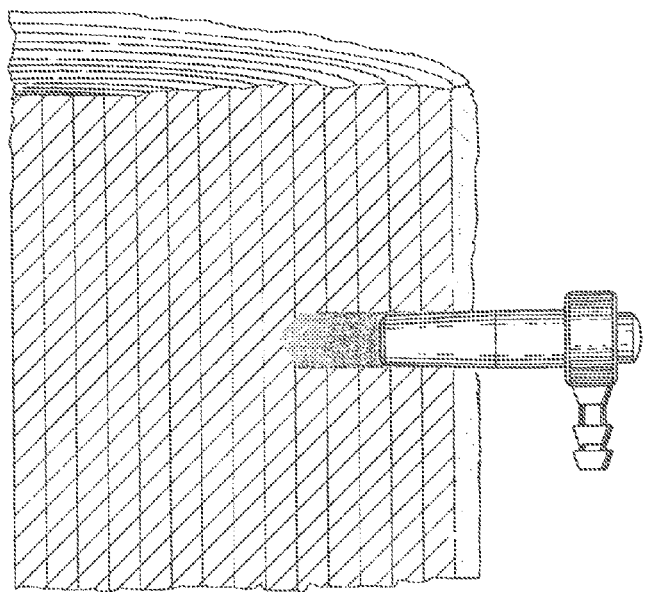
FIG. 1 is a side elevational view of a conventional sap-collecting device being shown inserted into a tapped hole of a tree.
Figure 2:
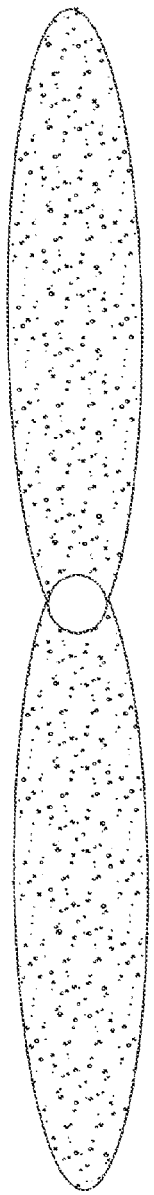
FIG. 2 is a schematic illustration of an extent of tree cracking caused by certain conventional sap-collecting devices.

FIG. 3 is a side elevational view of a sap collection device being inserted into a tapped hole of a tree, according to a preferred embodiment of the present invention. A "tapped hole" is understood in the art to be any man-made hole 92 made in the tree 90 and which allows the device 10 to be inserted into the tree 90. For example, the tapped hole 92 can be created using an electric drill having a drill bit suitable for wood drilling and of the appropriate dimension. Once the tapped hole 92 is created, the device 10 can be therein inserted and connected to a collection system, which may include a network of tubing and a central pump, so as to direct the sap collected from the tree 90 to a central sap-processing plant or reservoir, for example. Since the device 10 is preferably cylindrical and/or circular, it naturally conforms to the shape of the tapped hole 92, thus facilitating a frictional engagement.

FIG. 4 is a side elevational view of the device 10 shown in FIG. 3. It comprises an inlet 12, an outlet 14, and an elongated collector 20.

The inlet 12 is located on the part of the device 10 that is forcibly inserted into the tapped hole 92 of the tree 90, usually by a user employing a hammer, for example. The inlet 12 receives the sap that is produced by the tree 90. The outlet 14 is preferably the part of the device 10 that is connected to a sap-collecting bucket and/or the collection system, so as to direct the sap to the sap-processing plant. This connection is removable, which allows the outlet 14 and/or the device 10 to be removed from the collection system when necessary. The outlet 14 is preferably diametrically opposite the inlet 12. Preferably, both the inlet 12 and the outlet 14 are cylindrical and/or circular, and each defines a circular and/or oval aperture and/or opening when viewing the device from the front or the rear. As shown in FIGS. 4 and 5, the inlet cross-sectional area 12a and the outlet cross-sectional area 14a are preferably different (i.e. the areas 12a, 14a being not the same), which better defines and exemplifies the "sloped" or "inclined" nature of the collector sections, as further discussed below. Preferably, the outlet area 14a is greater than the inlet area 12a, thereby allowing the sap to flow more easily flow the inlet 12 to the outlet 14.

Figures 6, 7:
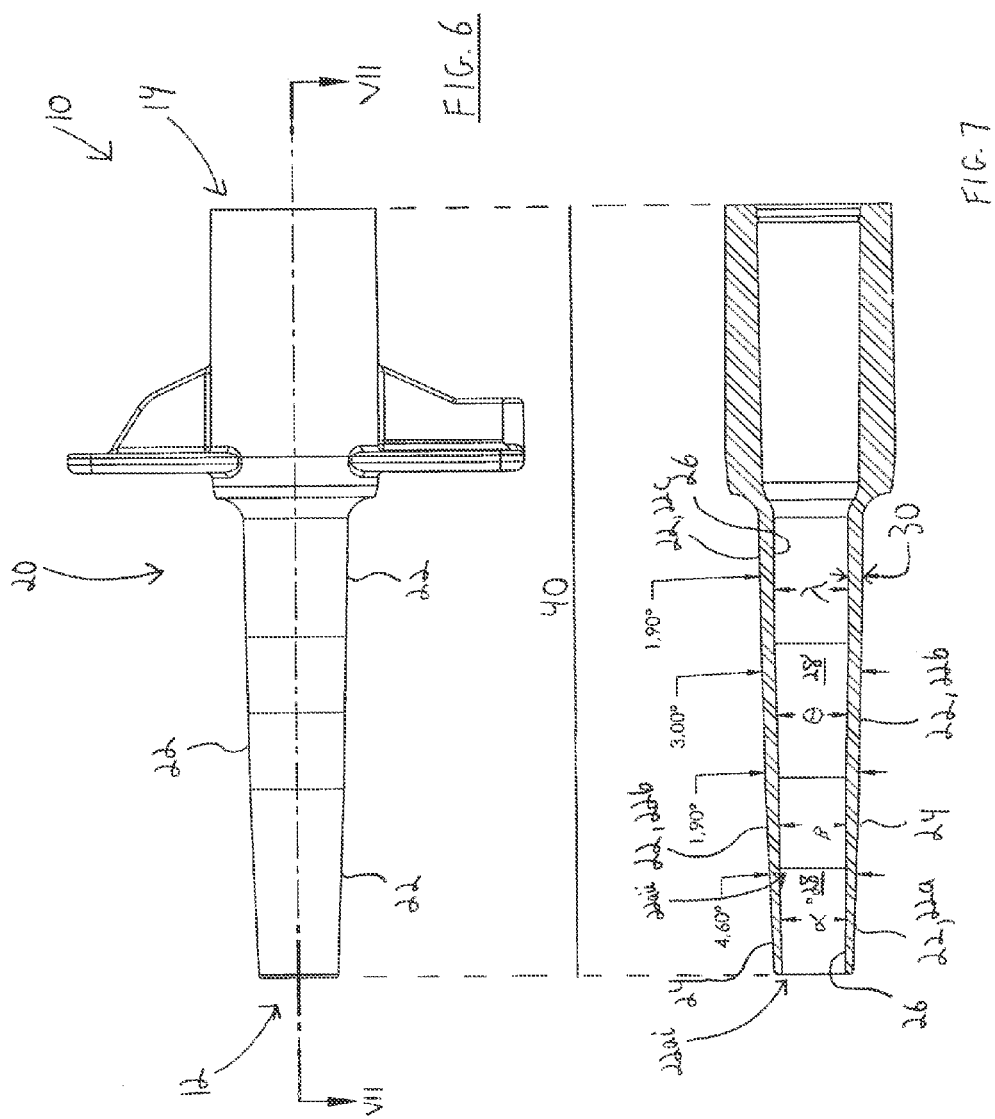
FIG. 6 is side elevational view of another device according to the present invention.
FIG. 7 is a cross-sectional view of the device of FIG. 6 taken along line VII-VII in FIG. 6.

Referring to FIG. 6, the collector 20 extends between the inlet 12 and the outlet 14, thus defining a length 40 of the collector 20.

The collector 20 is provided with at least one collector section 22 which extends along at least a portion of the length 40. By "at least a portion", it is understood that the at least one collector section 22 could extend along the entire length 40 of the collector 20, but that it is not limited to only this configuration. The at least one collector section 22 could alternatively extend along only a portion of the length 40 of the collector 20, and the collector 20 could be provided with a plurality of collector sections 22, each collector section 22 being connected to an adjacent collector section 22 so as to form a unified and smooth collector 20, as exemplified in FIG. 6.

Referring to FIGS. 6 and 7, each collector section 22 preferably includes an outer peripheral wall surface 24, which is configured for frictionally engaging with at least a portion of the tapped hole 92 of the tree 90. By "configured", it is understood that the outer wall surface 24 can be in contact with the inner surface of the tapped hole 92. This contact is frictional in nature, and the friction can be generated from a number of different sources (i.e. the diameter of the outer wall surface 24 being slightly larger than the diameter of the tapped hole 92 thus creating a forced frictional fit, pressure exerted by the tree 90 via the tapped hole 92 against the outer wall surface 24, etc.). By "engaging with at least a portion of the tapped hole 92", it is understood that the outer wall surface 24 of a given collector section 22 may not frictionally engage with the entire and/or a portion of the tapped hole 92, as this depends on the portion of the collector 20 that is inserted into the tapped hole 92. Alternatively, many collector sections 22 may be in frictional engagement with the entire and/or a portion of the tapped hole 92 at the same time, again depending on the length of the tapped hole 92 and the portion of the collector 20 that is inserted into the tapped hole 92.

Each collector section 22 also preferably includes an inner peripheral wall surface 26 which provides a sap channel 28 for conveying the sap from the inlet 12 to the outlet 14. The sap channel 28 can also be referred to as a conduit, throughway, pipeline, etc., and is preferably defined by the circular periphery of the inner wall surface 26. The inner wall surface 26 and outer wall surface 24, and thus at least one portion of the collector 20, are also substantially frustoconical. The term "frustoconical" is defined as having the shape of a frustum of a cone, where a frustum is defined as the portion of a cone or pyramid which remains after a portion of the cone and/or pyramid has been cut off by at least one plane parallel to its base, or which is intercepted between two such planes. It follows that the inner wall surface 26 of each collector section 22 is preferably conical in shape, and is inclined from the end of each collector section 22 closest to the inlet 12 to the end closest to the outlet 14, thereby allowing the thickness 30 of the collector 20 to vary and reduce from the outlet 14 to the inlet 12 of the device. It is understood, especially when referring to the figures, that the word "inclined" means that the inner wall surface 26 increases or decreases in its cross-sectional area, but preferably increases. Of course, it is also understood that inner wall surface 26 is not limited to a conical configuration or conical solids (i.e. cones, pyramids, prisms, spheres, tori, etc.), because the term frustoconical is understood in the art as meaning substantially the shape created by breaking (the meaning of the Latin "frusto") any single-sided and/or polygonal expansive and/or compressive hollow solid along at least one plane parallel to its base. As but one example, the inner wall could be formed from the broken sections of an expanding rectangular hollow solid. The outer wall surface 24 is also preferably substantially frustoconical so that the collector 20 is frustoconical, the term frustoconical meaning the same as when it is used to describe the inner wall surface 26.

The material present in the space between the inner wall surface 26 and the outer wall surface 24 defines a thickness 30. The thickness 30 is exemplified in FIG. 7 in cross-section, but it is understood that the thickness 30 is peripheral and contiguous with the inner and outer wall surfaces 26, 24. Explained differently, in the configuration where the device 10 is cylindrical, the thickness 30 is preferably a cylindrical solid body between the cylinder inner and outer wall surfaces 26, 24. As exemplified in FIG. 7, each collector section 22 can have a different thickness 30, with the thickness 30 of one collector section 22 being greater than, less than, and/or equal to the thickness of an adjacent collector section 22. Varying the thickness 30 along its length 40 advantageously permits the user of the device 10 to insert the device 10 into the corresponding tapped hole 92 so as to obtain the appropriate frictional engagement of the device 10 with the tapped hole 92, as further explained below. For similar reasons and so as to obtain similar advantages, the length of each collector section 22 can be greater, equal to, and/or less than the length of an adjacent collector section 22.

The thickness 30 of the inlet collector section 22a, described in more detail below, can also vary along the length of the inlet collector section 22a. Preferably, the inlet collector section 22a has an inlet end 22ai near the inlet 12, and a collector end 22aii away from the inlet 12 and towards the outlet 14, the collector end 22aii being attached to the nearest adjacent collector section 22. The thickness 30 at the inlet end 22*ai* is preferably no more than about 1/32" inch. This thickness 30 can vary by about 5 thousandths of an inch.

The inner wall surface 26 and outer wall surface 24 of each collector section 22 are preferably provided with a frustoconical angle and radius. The inner wall surface 26 preferably has inner angles $\alpha$, $\beta$, $\theta$, and $\lambda$, examples of such inner angles being shown in FIG. 7. These inner angles are preferably frustoconical, which means that they are measured as the radian distance between two 180° opposed points on the inner wall surface 26 (or on the outer wall surface 24). The inner angle of each collector section 22 can be equal to and/or different from the inner angle of an adjacent collector section 22. It is also understood that the inner angle of a single collector section 22 can vary along its length.

For example, in FIG. 7, the collector 20 comprises at least three collector sections 22, namely an inlet collector section 22*a* near the inlet 12, at least one middle collector section 22*b* between the inlet 12 and the outlet 14, and an outlet collector section 22*c* near the outlet 14. Preferably, the inlet collector section 22*a* has an inner angle $\alpha$ ranging between about 2° to 5°, the inner angle $\beta$ of the first middle collector 22*b* section is between about 0.02° to 2°, the inner angle $\theta$ of the second middle collector section 22*b* is between about 1° to 4°, and the inner angle $\lambda$ of the outlet collector section 22*c* is about 0.02° to 2°. It is understood that these inner angles can vary depending on numerous factors such as: the desired thickness 30 of a given collector section 22, the angles of adjacent collector sections 22, the necessity to increase or decrease the sap flow rate through the sap channel 28, etc. It is also understood that not all of these angles need to be "expanding" (i.e. defining a collector section 22 that expands from its inlet side to its outlet side), and can be "converging" (i.e. defining a collector section 22 that converges from its inlet side to its outlet side).

The outer wall surface 24 is also preferably sloped and/or inclined according to a frustoconical outer angle, which can vary between the collector sections 22 and also within the same collector section 22. For example, in FIG. 7, the outer angle of the inlet collector section 22*a* can be about 4.60°, the outer angle of the first middle collector section 22*b* can be about 1.90°, the outer angle of the second middle collector section 22*b* can be about 3.00°, and the outer angle of the outlet collector section 22*c* can be about 1.90°. Variants are possible.

In FIG. 4, the device 10 includes at least two elongated collector sections. The device 10 can include a first collector section 20*a* which connects to a second collector section 20*b* so as to form a single unified collector 20. The first collector section 20*a* preferably collects the sap from the tree 90 into which it is inserted, and conveys the sap to the second collector section 20*b*, which thence transfers it to the collection system. The advantage of having at least two connector sections is that the collector 20 can be extended without hindering the collection of the sap from the tree 90, while also allowing at least one tab 50 to be attached to the second collector section 20*b*, as herein described. Preferably, two tabs 50 are provided, each tab 50 projecting perpendicularly from the second collector section 20*b* and each tab 50 being diametrically opposite one another. Using more tabs 50 or a configuration of tabs 50 that differs from that shown in FIG. 4 is possible. The tabs 50 allow the user to easily grip the device 10 and when hammering or inserting it, the user's fingers can be protected, for example. The tabs 50 also prevent the device 10 from being irremovably inserted into the tree 90 by the user. Furthermore, the tabs 50 allow the user to handle the device 10 more easily, and also allow a sap-collecting bucket and/or other receptacle to be attached thereto.

According to the present invention, the device 10 is made of a substantially flexible but lightweight polymeric material, such as nylon, polycarbonate, a hardened polymer, plastic, rubber, or composite materials, so as to elastically deform in response to a compressive/peripheral pressure exerted by the tree 90, thereby providing a more secure frictional engagement between the outer peripheral wall surface 24 and the tapped hole 92.

The present invention is a substantial improvement over the prior art in that, by virtue of its design and components, the device 10 is simple and easy to use, as well as is simple and easy to manufacture, without compromising the reliability of its functions. Hence, as can be appreciated, the device 10 can be easily inserted by a user into a tree 90 so as to collect sap therefrom, without causing damage to said tree 90 and without falling out of the tree 90 during cold weather conditions.

Unlike prior art devices, the device 10 can be manufactured as having "thin walls" because of the unique frustoconical shape of its inner wall surface 26 and, preferably, its outer wall surface 24, as well as their preferably different angles, which allow the device 10 to have collector sections 22 of varying thickness 30 so as to have the required wall thickness 30 and strength at a given point, depending on its position in the tree 90. These varied thicknesses along the length 40 of the device 10 are unknown in the art, and advantageously allow the device 10 to be inserted into a corresponding tapped hole 92 and to automatically frictionally engage with the tapped hole 92, largely irrespective of the diameter of the tapped hole 92.

This optimal frictional engagement further advantageously provides a tight seal between the tapped hole 92/bark of the tree 90, and the device 10, thus preserving the "vacuum" and significantly reducing the amount of air that can leak into the tapped hole 92. This helps in maintaining the vacuum in the collection system, thus increasing the efficiency of sap collection. The tight seal further advantageously reduces the likelihood of water entering the tapped hole 92 and/or bark, and thus the damage caused to the tree 90 when this water freezes.

Another advantage provided by the frictional engagement of the device 10 with the tree 90 is that the device 10 will not be easily dislodged and/or loosened in the tapped hole 92 for the entire sap-collecting season, thus further protecting the tree 90 and reducing the labour associated with the reinsertion of dislodged conventional devices. Thus, less labour is needed to reinsert and reseal the device with a hammer or other means, thus causing further damage to the tree. Given the number of tapped holes in a tree over many years, it is understood that the damage to the tree will be greatly significantly reducted to a minimum and healing will be greatly improved.

Furthermore, the device 10, as a result of its thin, angled walls, can advantageously respond to a pressure exerted by the tree 90 at the tapped hole 92 by elastically and temporarily deforming. In so doing, the device 10 adapts to the hardness of a given tree 90, rather than doing the opposite as with conventional sap-collecting devices which force the tree 90 to adapt to them. This better protects the bark of the tree 90, and limits the damage caused by the tapped hole 92. Given the number of tapped holes 92 that can be tapped in a single tree 90 over its productive lifetime, this accommodation provides a significant commercial benefit by extending the useful life of the tree 90. Indeed, the thin inlet end 22*ai* can elastically deform in response to a compressive pressure exerted by the tree 90, which can create several small ribs allowing sap to be freely collected at the inlet 12 without restriction. The device 10 allows even beginner sap collectors to drill tapped holes 92 and to install devices 10 correctly without causing damage to the trees.

A further advantage of the device 10 is that it is more "user-friendly" because its angled inner wall surface 26 can "auto-align" with the tapped hole 92, thus allowing even novice users to effectively collect sap. The angled inner wall surface 26 further allows the collected sap to flow more smoothly ice that forms to be moved out of the tapped hole 92, thereby further protecting the tree 90.

Another advantage of the device 10 is that its "thinness" can be also obtained by varying the material thickness and hardness in the collector sections 22. The device 10 can advantageously accommodate trees 90 which are harder and/or softer, exert less and/or more compressive pressure, are more and/or less resistant, etc.

Of course, numerous modifications could be made to the above-described embodiments without departing from the scope of the invention, as defined in the appended claims.

The invention claimed is:

1. A device for collecting sap from a tapped hole of a tree and directing the sap to a collection system that is removably connectable to the device, the device including an elongated collector extending lengthwise between an inlet and an outlet of the device, the collector having a substantially frustoconical outer peripheral wall surface and an inner peripheral wall surface, both peripheral wall surfaces being spaced apart from one another by a thickness of a single material, the thickness of the single material decreasing between the outlet and the inlet of the device, the inner peripheral wall surface defining a sap channel for conveying the sap collected at the inlet to the outlet of the device, the collector having a portion that is removably insertable into the tapped hole with a frictional engagement generated by a contact of the outer peripheral wall surface with an inner surface of the tapped hole, the single material between the peripheral wall surfaces at the removably-insertable collector portion being elastically and temporarily deformable in response to a peripheral pressure exerted inwardly on the outer peripheral wall surface when the removably-insertable collector portion is inserted with a forced frictional fit into the tapped hole to generate the frictional engagement, the thickness of the single material being about 1/32 inch or less at the inlet of the device.

2. The device according to claim 1, wherein the collector comprises a plurality of adjacently-disposed collector sections.

3. The device according to claim 2, wherein the thickness of the single material of each collector section differs from the thickness of an adjacent one of the collector sections.

4. The device according to claim 2, wherein each collector section has a length that differs from the length of an adjacent one of the collector sections.

5. The device according to claim 2, wherein the inner peripheral wall surface of each collector section has an inner angle that differs from the inner angle of an adjacent one of the collector sections.

6. The device according to claim 2, wherein the outer peripheral wall surface of each collector section has an outer angle that differs from the outer angle of an adjacent one of the collector sections.

7. The device according to claim 2, wherein the collector comprises an inlet collector section at the end of which is located the inlet of the device, an outlet collector section located adjacent to the outlet of the device, and at least one middle collector section located between the inlet collector section and the outlet collector section.

8. The device according to claim 7, wherein the collector includes a first and a second middle collector section, the inner angle of the inlet collector section is about 2° to 5°, the inner angle of the first middle collector section is about 0.02° to 2°, the inner angle of the second middle collector section is about 1° to 4°, and the inner angle of the outlet collector section is about 0.02° to 2°.

9. The device according to claim 1, wherein the single material is a polymer.

10. The device according to claim 1, wherein the frictional engagement at the removably-insertable collector portion between the outer peripheral wall surface and the inner surface of the tapped hole is made over substantially the entire outer peripheral wall surface being inserted into the tapped hole.

* * * * *